UNITED STATES PATENT OFFICE.

FREDERICK DRITTLER, OF RUTHERFORD, NEW JERSEY, ASSIGNOR TO THE ARABOL MANUFACTURING COMPANY, OF NEW YORK, N. Y., A CORPORATION OF NEW YORK.

PROCESS OF TREATING STARCH.

No. 847,985. Specification of Letters Patent. Patented March 19, 1907.

Original application filed March 9, 1906, Serial No. 305,154. Divided and this application filed August 23, 1906. Serial No. 331,687.

*To all whom it may concern:*

Be it known that I, FREDERICK DRITTLER, a former subject of the Emperor of Germany, having declared my intention to become a citizen of the United States, a resident of Rutherford, in the county of Bergen and State of New Jersey, have invented certain new and useful Improvements in the Process of Treating Starch, of which the following is a specification.

My present invention forms a division of my copending application, Serial No. 305,154, filed March 9, 1906, for process of rendering starch capable of swelling in cold water, and relates to the use of derivatives of the hydrocarbons, as disclosed but not specifically claimed in said prior application.

My invention consists, essentially, in mixing dry powdered commercial starch with a suitable quantity of a liquid-halogen substitution product or other derivative of a hydrocarbon and then adding thereto a suitable quantity of caustic alkali. I wish, however, to include only such derivatives as are chemically inactive with respect to starch and at ordinary temperatures are liquids of an oily nature and practically insoluble in and non-miscible with water.

Among the various derivatives I have found such liquids as carbon tetrachlorid, carbon bisulfid, nitrobenzene, &c., to be satisfactory, particularly carbon tetrachlorid, because of its non-inflammability and comparative inexpensiveness, or a mixture of this compound with crude paraffin-oil of the specific gravity 0.865 in the proportion of one to one by volume.

In carrying out my process I take one hundred parts, by weight, of pulverized dry starch, such as ordinary corn-starch, and treat this with approximately eighty parts, by weight, of a liquid derivative of a hydrocarbon of the character specified or with sufficient volume thereof to make a semifluid mass and then thoroughly mix the two by stirring. After the starch has been thoroughly mixed with such a liquid I add forty to fifty parts, by weight, of liquid caustic alkali, as caustic soda, at 30° Baumé for every one hundred parts starch contained in the mixture. The mass upon being thoroughly mixed changes almost instantaneously into a voluminous dry fluffy powder. The derivative, which is usually selected to be volatile at a moderate temperature, may then, if desired, be removed from the dry powder by evaporation, condensed, and used over again. An alkaline starch is thus produced which is capable of swelling in cold water.

To prepare a neutral starch of similar properties, an equivalent amount of an acid—preferably some organic acid, as acetic, citric, tartaric, oxalic, &c., or watery solutions thereof—is added about one hour after the addition of the caustic alkali. If it be desired to remove the derivative, this is preferably done prior to the neutralization. A perfectly neutral starch capable of swelling in cold water is thereby produced.

Instead of a liquid acid I may use non-hygroscopic acids in the crystalline or powdered condition in equivalent amounts to neutralize the alkali used, the neutralization taking place upon the immersion in water.

The starch, whether neutral or alkaline, bursts when it comes in contact with water and readily swells in cold water up to the proportion of about one to ten parts, by weight, respectively, forming a viscous mass similar to gum-tragacanth and suitable for most purposes for which the said gum-tragacanth has been used and applied.

For some purposes the presence in the finished starch-powder of the hydrocarbon derivatives is of advantage, and in such cases they may be left in the modified starch.

What I claim as new, and desire to secure by Letters Patent of the United States, is—

1. The herein-described process for rendering starch capable of swelling in cold water, consisting in: first mixing the starch with a liquid derivative of a hydrocarbon, insoluble in water; and then adding caustic alkali.

2. The herein-described process for rendering starch capable of swelling in cold water, consisting in: first mixing the starch with a liquid derivative of a hydrocarbon, insoluble in water; then adding caustic alkali; and finally removing said derivative.

3. The herein-described process for rendering starch capable of swelling in cold water, consisting in: first mixing the starch with a liquid derivative of a hydrocarbon, insoluble in water; adding caustic alkali; removing said derivative; and finally neutralizing said alkaline starch.

4. The herein-described process of rendering starch capable of swelling in cold water, consisting in: first mixing the starch with a liquid-halogen substitution product of a hydrocarbon, insoluble in water; and then adding caustic alkali.

5. The herein-described process for rendering starch capable of swelling in cold water, consisting in: first mixing the starch with a liquid-halogen substitution product of a hydrocarbon, insoluble in water; then adding caustic alkali; and finally removing said halogen substitution product.

6. The herein-described process for rendering starch capable of swelling in cold water, consisting in: first mixing the starch with a liquid-halogen substitution product of a hydrocarbon, insoluble in water; adding caustic alkali; removing said halogen substitution product; and finally neutralizing said alkaline starch.

7. The herein-described process for rendering starch capable of swelling in cold water, consisting in: first mixing the starch with carbon tetrachlorid; and then adding caustic alkali.

8. The herein-described process for rendering starch capable of swelling in cold water, consisting in: first mixing the starch with carbon tetrachlorid; then adding caustic alkali; and finally removing said carbon tetrachlorid.

9. The herein-described process of rendering starch capable of swelling in cold water, consisting in: first mixing the starch with carbon tetrachlorid; adding caustic alkali; then removing the said carbon tetrachlorid; and finally neutralizing said alkaline starch.

Signed at New York, in the county of New York and State of New York, this 22d day of August, 1906.

FREDERICK DRITTLER.

Witnesses:
FREDK. F. SCHUETZ,
G. W. REED.